United States Patent
Fang et al.

(10) Patent No.: US 6,554,450 B2
(45) Date of Patent: Apr. 29, 2003

(54) ARTIFICIAL LIGHTING APPARATUS FOR YOUNG PLANTS USING LIGHT EMITTING DIODES AS LIGHT SOURCE

(75) Inventors: Wei Fang, No. 1, Sec. 4, Lo-Szu-Fu Rd., Taipei (TW); Rueychi Jao, Taipei Hsien (TW); Den Hua Lee, 4F-15, No. 126, Sheng-Li Rd., Hsinchu (TW)

(73) Assignees: Wei Fang, Taipei (TW); Den Hua Lee, Hsinchu (TW)

( * ) Notice: Subject to any disclaimer, the term of this patent is extended or adjusted under 35 U.S.C. 154(b) by 0 days.

(21) Appl. No.: 09/921,914

(22) Filed: Aug. 6, 2001

(65) Prior Publication Data

US 2002/0154504 A1 Oct. 24, 2002

Related U.S. Application Data

(63) Continuation-in-part of application No. 09/837,170, filed on Apr. 19, 2001, now Pat. No. 6,474,838.

(51) Int. Cl.[7] .................................................. F21V 9/02
(52) U.S. Cl. ....................... 362/231; 362/805; 362/800; 47/17; 47/DIG. 6; 315/185 R
(58) Field of Search ................. 362/145, 563, 362/226, 800, 805, 227, 230, 231, 1, 2, 295; 315/308, 169, 169.3, 185 R, 185 S, 208, 291, 294; 47/17, 58.1, DIG. 6, 65.5, 101 R

(56) References Cited

U.S. PATENT DOCUMENTS

| | | | | |
|---|---|---|---|---|
| 4,396,872 A | * | 8/1983 | Nutter | 315/308 |
| 5,660,461 A | * | 8/1997 | Ignatius et al. | 362/800 |
| 6,220,722 B1 | * | 4/2001 | Begemann | 362/231 |
| 6,312,139 B1 | * | 11/2001 | Baker et al. | 362/145 |

FOREIGN PATENT DOCUMENTS

| JP | 10-178901 | * | 7/1998 | 362/805 |
|---|---|---|---|---|

* cited by examiner

Primary Examiner—Stephen Husar
Assistant Examiner—Bao Q. Truong
(74) Attorney, Agent, or Firm—Birch, Stewart, Kolasch & Birch, LLP

(57) ABSTRACT

An artificial lighting apparatus for young plants that includes at least one electric track and a plurality of lamps. The lamps are detachably mounted on the electric track. Each of the lamps includes a box and a plurality of light emitting diodes mounted on the box. The electric track supplies the lamps with power to light the light emitting diodes. The driver provides the controlling capability on light quantity, quality, frequency and duty ratio.

21 Claims, 9 Drawing Sheets

ARTIFICIAL LIGHTING APPARATUS FOR YOUNG PLANTS USING LIGHT EMITTING DIODES AS LIGHT SOURCE

CROSS REFERENCE TO RELATED APPLICATION

This is a continuation-in-part application of U.S. patent application Ser. No. 09/837,170, filed Apr. 19, 2001, now U.S. Pat. No. 6,474,838.

BACKGROUND OF THE INVENTION

1. Field of the Invention

The present invention relates in general to an artificial lighting apparatus using light emitting diodes as a light source for young plants, especially plantlets growing in tissue culture vessels. During the lightperiod provided to the plant, the light quantity, light quality, duty ratio and frequency of the mixed light source of the present invention are adjustable.

2. Description of the Related Art

In the past, tubular fluorescent lamps (TFLs) were used as artificial light sources in plant tissue culture. However, TFL has problems including heat generation, easy decay, fixed light quality, short life span and flickering. Light emitting diodes (LEDs) have no excess heat problem; thus, LEDs can be arranged very close to the cultured plant to save space. In addition, LEDs have the advantages of a long life span and low power consumption. Therefore, research in culturing plants with LEDs has been proceeding. In 1992, Hoenecke, et al. successfully cultured vegetables by using high intensity red LEDs (Hoenecke, M. E., R. J. Bula, and T. W. Tibbitts, 1992, Importance of 'Blue' photon levels for lettuce seedlings grown under red-light-emitting diodes, Hort-Science 27(5):427–430). In 1993, blue LEDs were successfully developed. In 1996, Okamoto et al. used high intensity red LEDs and blue LEDs to culture plants, with the quantum ratio of 2:1 for red light/blue light (Okamoto, K., T. Yanagi and S. Takita, 1996, Development of plant growth apparatus using blue and red LED as artificial light source, Acta Hort., 440:111–116). Also in 1996, Yanagi et al. used blue LEDs (170 $\mu$mol/m$^2$/s) to culture lettuce (Yanagi, T., K. Okamoto and S. Takita, 1996, Effects of blue, red and blue/red lights of two different PPF levels on growth and morphogenesis of lettuce plants, Acta Hort, 440:117–122). The dry weight of the cultured lettuce using pure blue light was less than that of the lettuce cultured by pure red light or red/blue light. Nevertheless, the cultured lettuce was short and healthy.

SUMMARY OF THE INVENTION

All prior research was made on a small scale, while the present invention is provided for the purpose of mass production. The present invention provides a plant-growing bench including at least one electric track and a plurality of lamps. The lamps, referred to as LEDsets, are detachably mounted on the electric track. Each of the LEDset includes a mounting box and at least one type of light emitting diode mounted on the box. The electric track supplies the LEDsets with power to light the diodes.

BRIEF DESCRIPTION OF THE DRAWINGS

The present invention can be more fully understood by reading the subsequent detailed description and examples with references made to the accompanying drawings, wherein.

DETAILED DESCRIPTION OF THE PREFERRED EMBODIMENT

Figure 1:
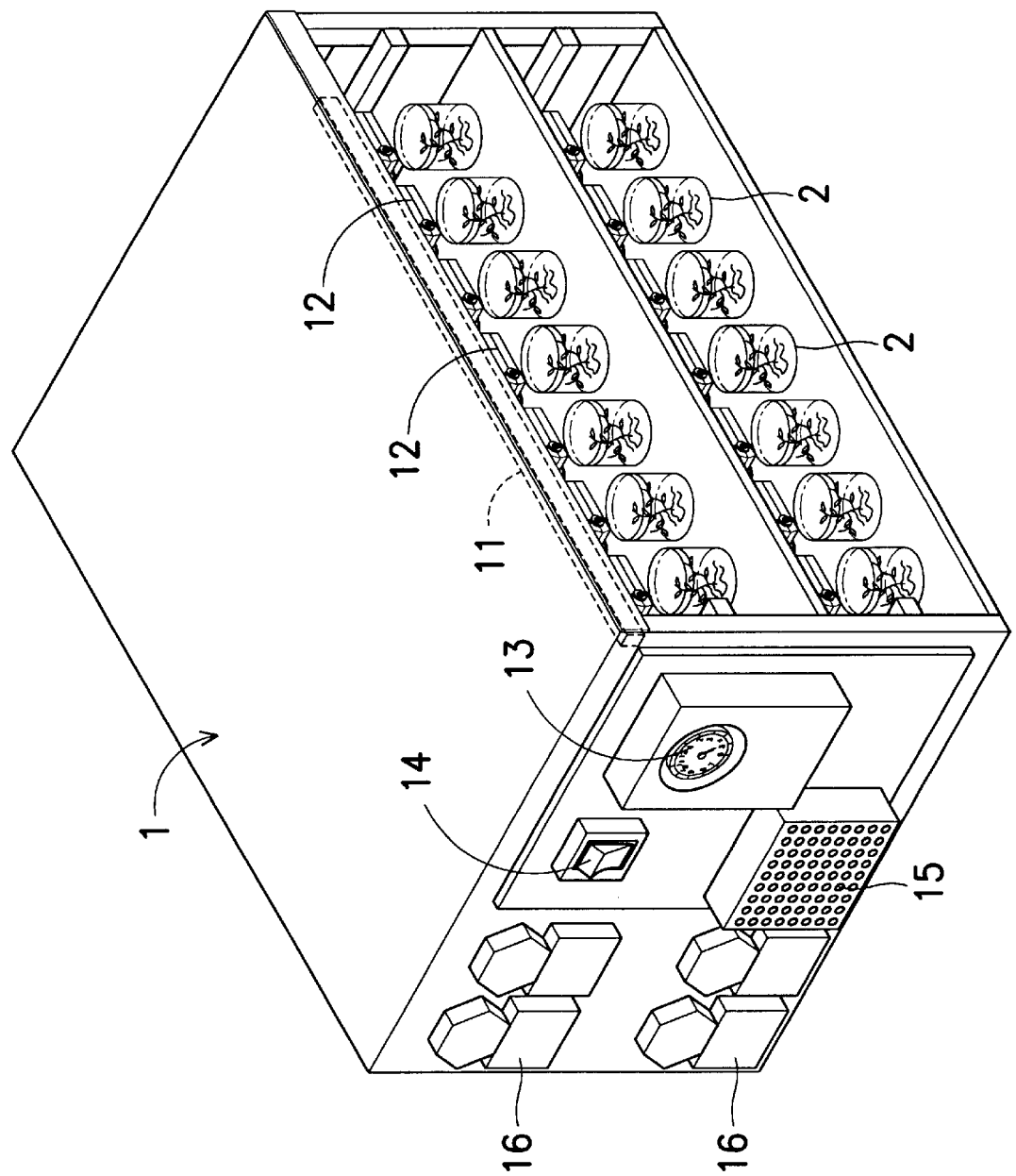
FIG. 1 is a perspective diagram of a plant-growing bench equipped with the present invention and related controlling device.

Referring to FIG. 1, a plant-growing bench 1 of the present invention can be partitioned into a plurality of layers. On the ceiling of each layer are mounted 3-wire electric tracks 11, while on each 3-wire electric track 11 are mounted LEDsets 12. Cultured plantlets 2 are provided in tissue culture vessels 2 under the LEDset 12. Furthermore, a timer 13, a switch 14, an AC/DC converter 15 and several drivers 16 are mounted on a sideboard of the plant-growing bench 1. The AC/DC converter 15 supplies the LEDsets 12 with power through the 3-wire electric tracks 11 to illuminate the plantlets in the vessels 2. The switch 14 is used for manually turning on/off the power. When the power is on, the timer 13 is used for the control of the photoperiod. A photoperiod of 16/8 indicates an exposure to the light for 16 hours daily. The first number is the duration in hours of the light period and the second number is the duration in hours of the dark period for every 24-hour period. The driver 16 is used to adjust the voltage, current, frequency and duty ratio by the direct current provided to the LEDsets 12, thereby controlling the light quantity, light quality and lighting cycle of the LEDsets 12 during the light-period. The LEDsets 12, electric tracks 11 and driver 16 are described in detail as follows.

Figure 2:
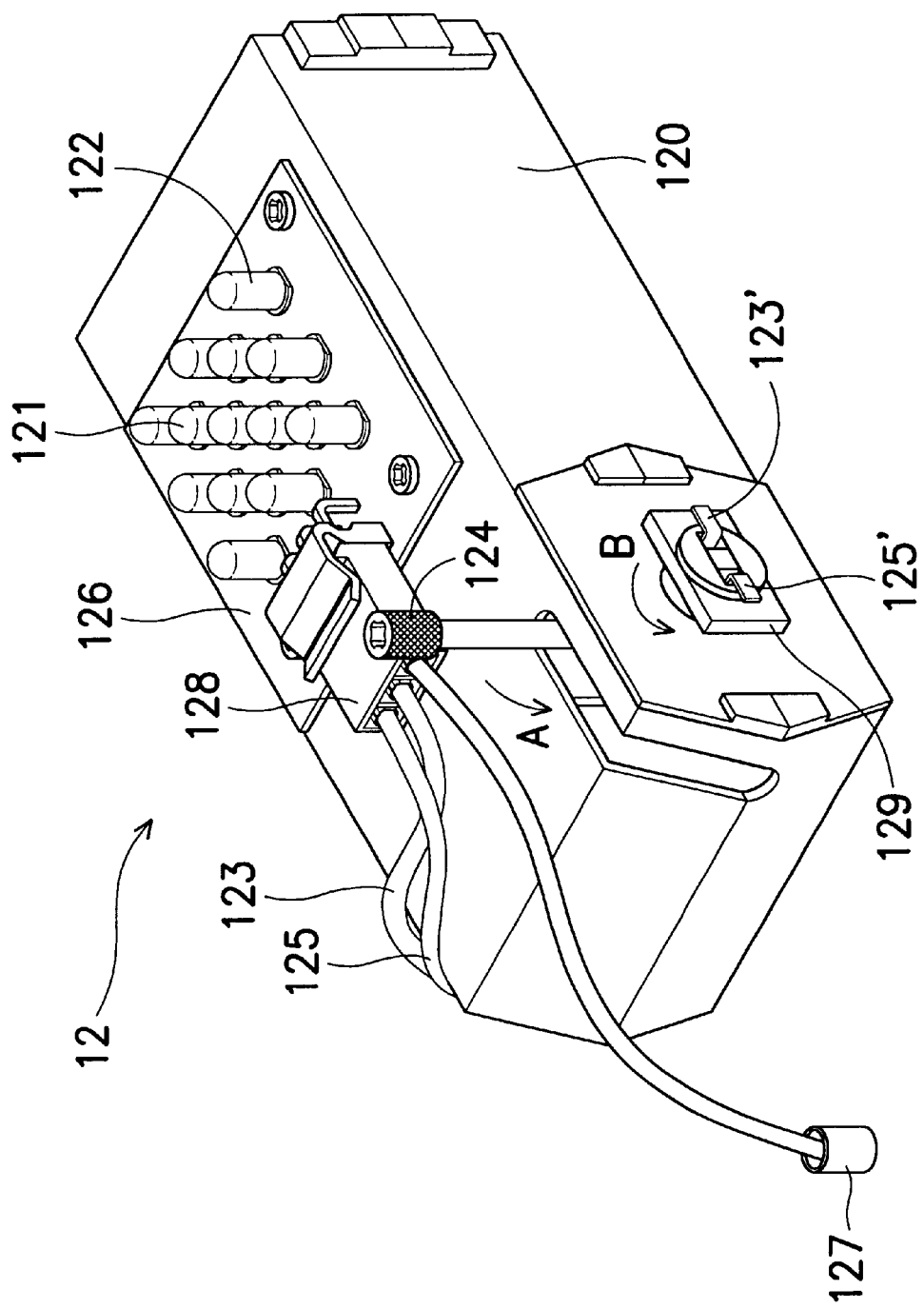
FIG. 2 is a perspective diagram of a LEDset of the present invention.
Figure 3:
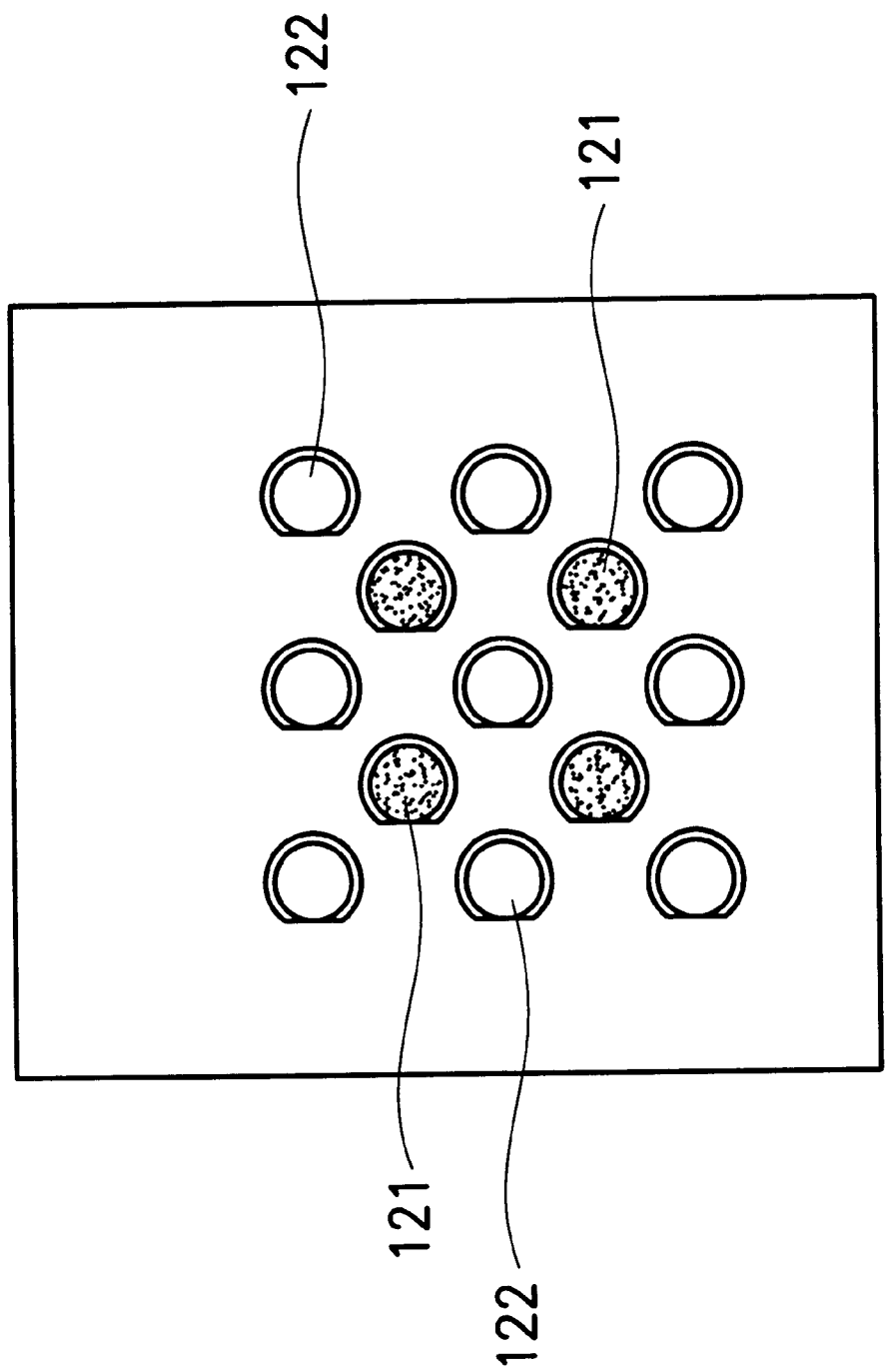
FIG. 3 depicts an arrangement of LEDs on a circuit board of the LEDset of the present invention.

Referring to FIGS. 2 and 3, the LEDset 12 has a mounting box 120 and a circuit board 126 on the box 120. First LEDs 121 and second LEDs 122 are alternately mounted on the circuit board 126. The first LEDs 121 are spaced apart the same distance. The first LEDs 121 can be red LEDs, blue LEDs, infrared LEDs or white LEDs. Similarly, the second LEDs 122 are spaced at the same distance. The second LEDs 122 can also be red LEDs, blue LEDs, infrared LEDs or white LEDs. It is therefore understood that the first LEDs 121 and the second LEDs 122 can be the same or be different. If the first LEDs 121 and the second LEDs 122 are different, then the first LEDs 121 and the second LEDs 122 require different voltages, thus requiring four wires in total to supply power. However, the present invention uses a common ground wire for the first LEDs 121 and the second LEDs 122, thereby reducing the number of wires to three. Referring to FIG. 2, the first LEDs 121 and the second LEDs 122 are connected to three wires 123, 125, 127 through the circuit board 126 and connector 128, wherein the wires 123, 125 are power lines and the wire 127 is the common ground line. Furthermore, an operating handle 124 and a locking element 129 are mounted on the box 120 of the LEDset 12. When the user pushes the operating handle 124 in direction A, the locking element 129 is rotated in direction B. Two electrodes 123', 125' are provided on the locking element 129 and electrically connected to the wires (power lines) 123, 125.

Figure 4:
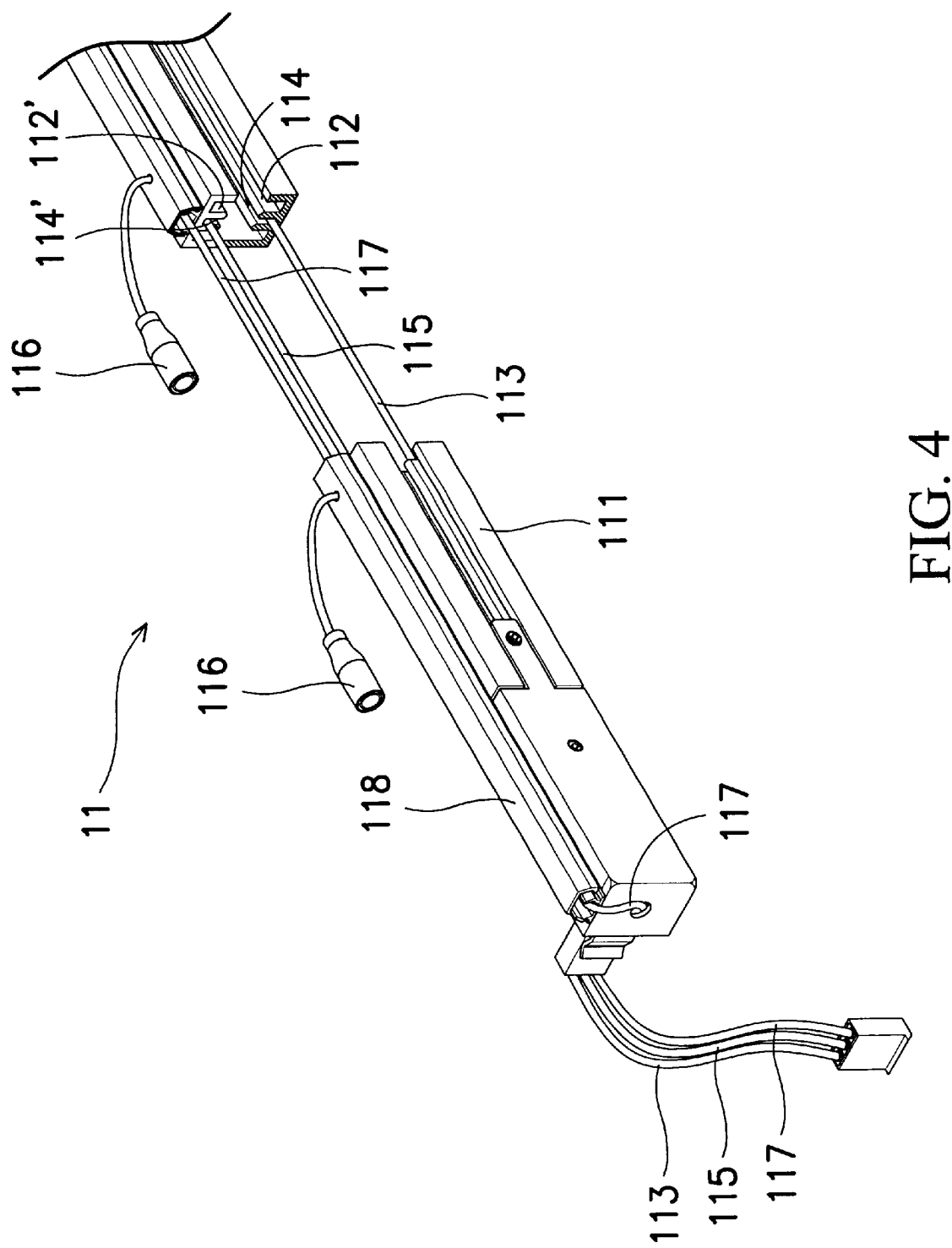
FIG. 4 is a perspective diagram of a 3-wire electric track of the present invention, which is modified from a commercially available 2-wire electric track.

FIG. 4 is a perspective diagram of the electric track of the present invention, with a cutaway to show the inside of the electric track. The electric track 11 has an elongated body 111 and a pair of longitudinal engaging grooves 112, 112' and receiving grooves 114, 114' provided in the body 111. Bare copper wires 113, 115 are received in the receiving grooves. An elongated cover 118 is fixed to the body 118. The common ground wire 117 is received in the cover 118 and laterally connected to a plurality of connectors 116 outside the cover 111.

Figure 5:
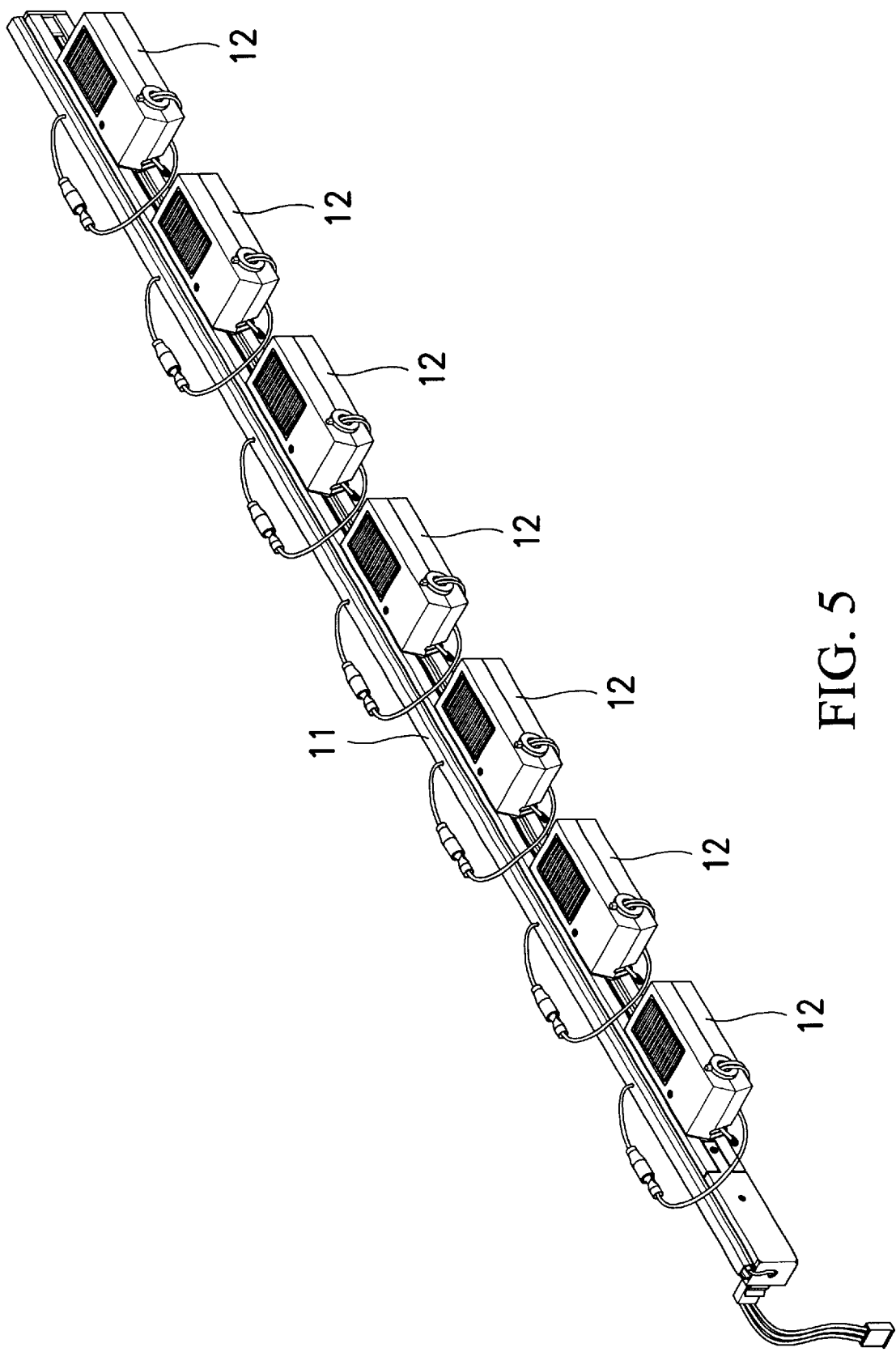
FIG. 5 depicts the 3-wire electric track of the present invention with LEDsets mounted thereon.

FIG. 5 depicts the electric track with LEDsets mounted thereon. The electric track 11 and the LEDsets 12 are assembled together in the following manner:

(1) The user puts the locking element 129 of the LEDset 12 in the electric track 11 and then pushes the handle 124 of the LEDset 12 to rotate the locking element 129 so that the LEDset 12 and the electric track 11 are locked together by the locking element 129. The electrodes 123', 125' of the LEDset 12 follow the locking element 129 to rotate and then physically contact the bare copper wires 113, 115.

(2) The user connects the ground wire 127 of the LEDset 12 to the connector 116 of the electric track 11.

Then, the electric track 11 supplies the LEDset 12 with power.

Figure 6A:
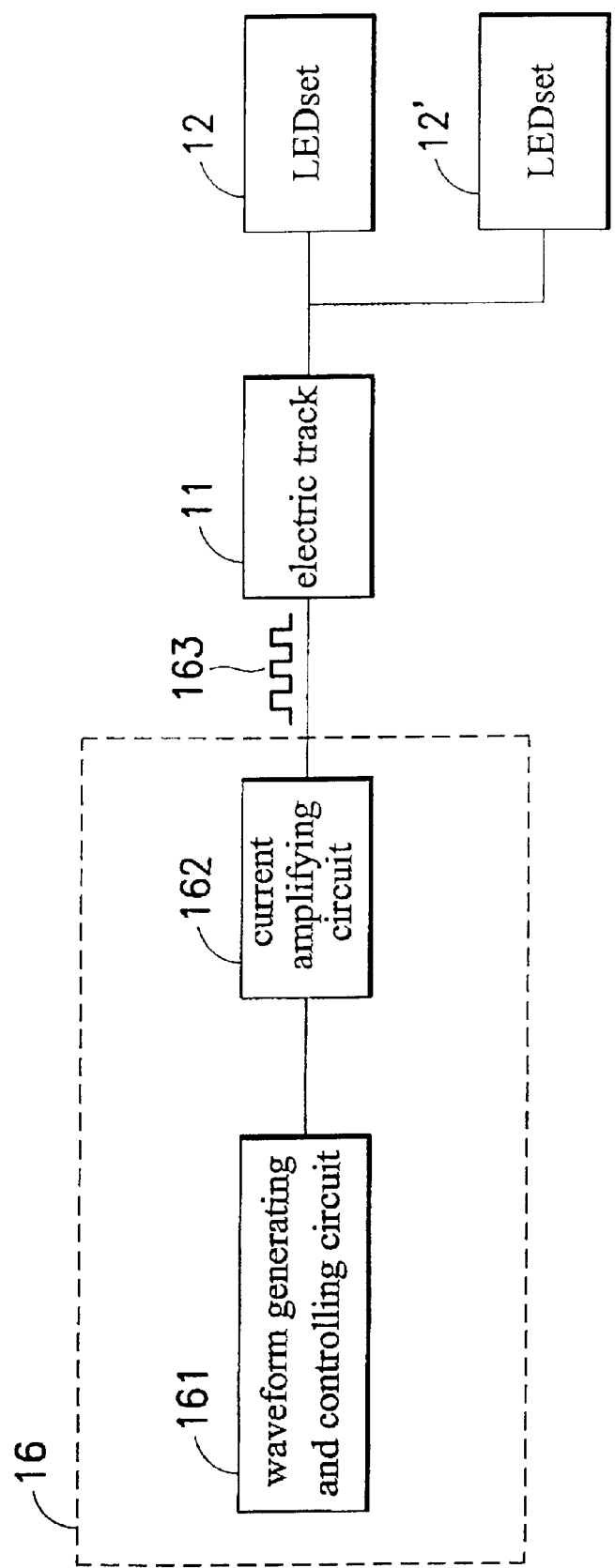
FIG. 6A is a block diagram of a driver of the artificial lighting apparatus of the present invention.
Figure 6B:
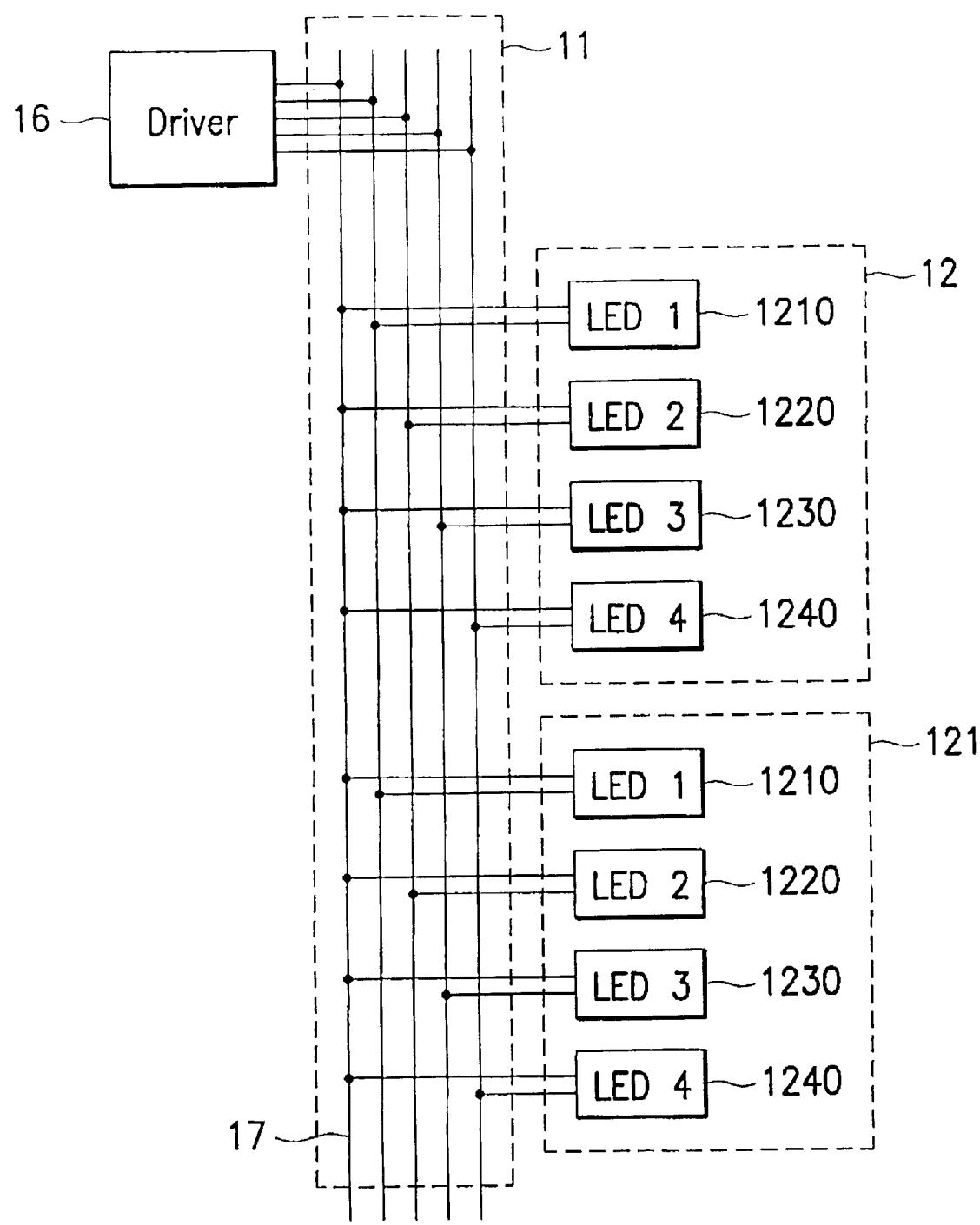
FIG. 6B is a block diagram of the circuit in FIG. 6A.

Referring to FIG. 6, the driver 16 includes a waveform generating and controlling circuit 161 and a current amplifying circuit 162. The waveform generating and controlling circuit 161 outputs the desired waveform (e.g. square waves, triangular waves, sine waves, cosine waves and pulses, etc.). Also, the waveform's amplitude, frequency and duty ratio, and the carrier wave for the waveform are adjustable by the waveform generating and controlling circuit 161. Then the waveform is amplified by the current-amplifying circuit 162 and sent to the LEDset 12 to control the LEDs' light quantity and lighting cycle. The current of different types of LEDs can be controlled separately, thus controlling the light quality.

Figure 7:
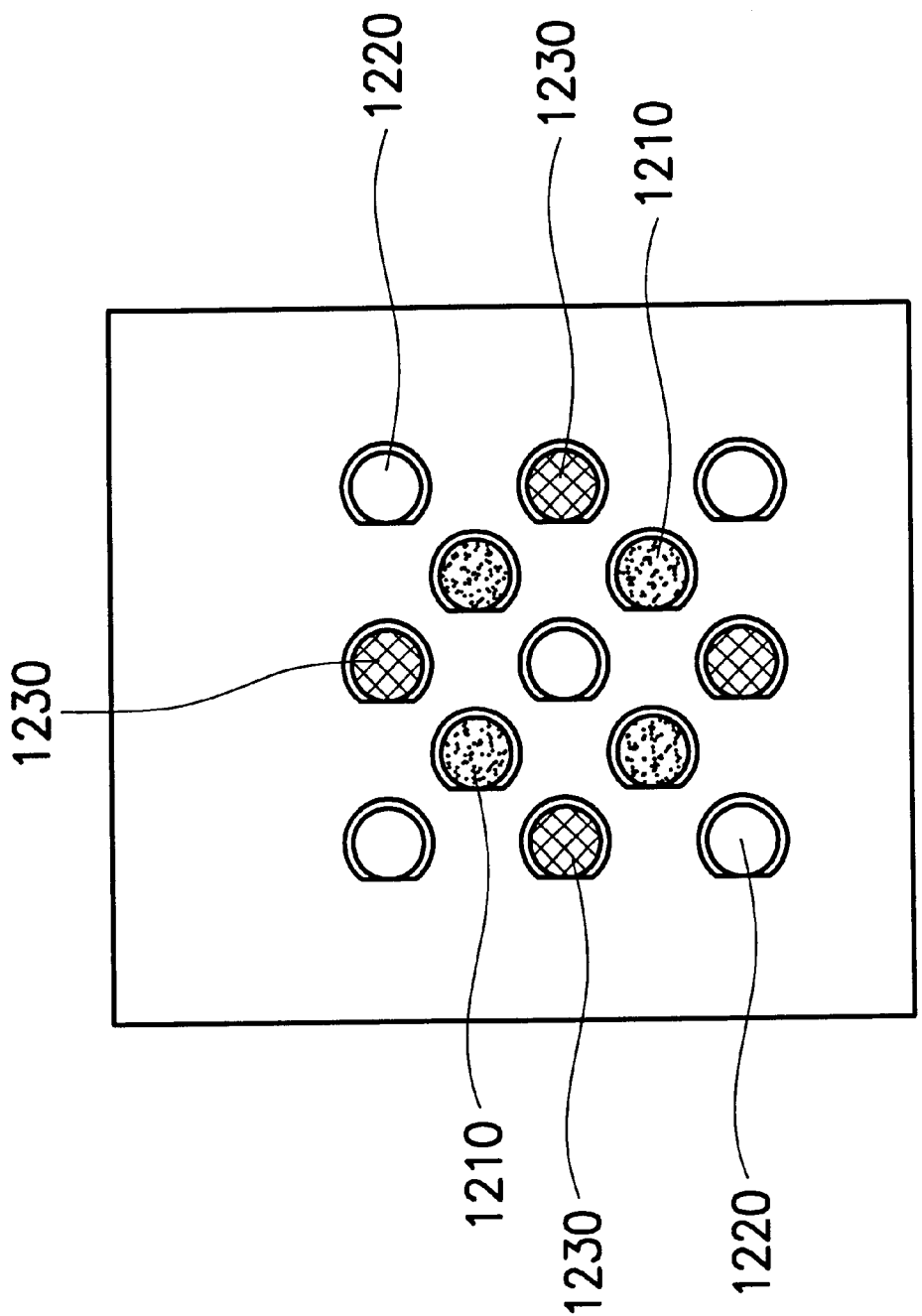
FIG. 7 depicts another arrangement of LEDs on a circuit board of the LEDset of the present invention.

FIG. 7 depicts another arrangement of LEDs on a circuit board of the LEDset of the present invention, wherein reference numeral 1210 represents the first LEDs, 1220 the second LEDs and 1230 the third LEDs. The first LEDs 1210 can be red LEDs, blue LEDs, infrared LEDs or white LEDs. The second LEDs 1220 can be red LEDs, blue LEDs, infrared LEDs or white LEDs. Also, the third LEDs 1230 can be red LEDs, blue LEDs, infrared LEDs or white LEDs.

Figure 8:
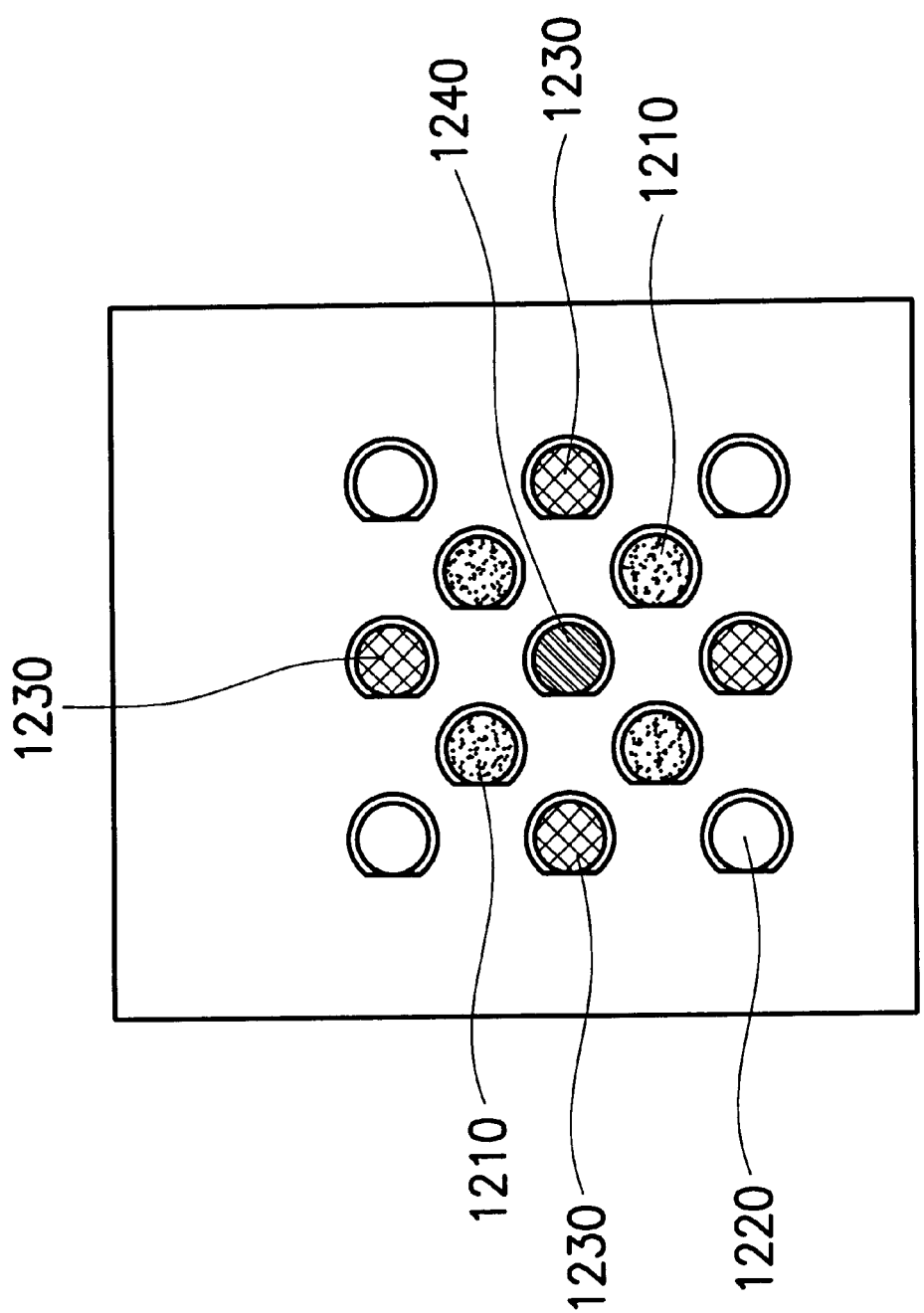
FIG. 8 depicts another arrangement of LEDs on a circuit board of the LEDset of the present invention.

FIG. 8 depicts another arrangement of LEDs on a circuit board of the LEDset of the present invention, wherein reference numeral 1210 represents the first LEDs, 1220 the second LEDs, 1230 the third LEDs and 1240 the fourth LEDs. The first LEDs 1210 can be red LEDs, blue LEDs, infrared LEDs or white LEDs. The second LEDs 1220 can be red LEDs, blue LEDs, infrared LEDs or white LEDs. The third LEDs 1230 can be red LEDs, blue LEDs, infrared LEDs or white LEDs. Also, the fourth LEDs 1240 can be red LEDs, blue LEDs, infrared LEDs or white LEDs.

Furthermore, it is understood that the above-mentioned LEDs include laser diodes. That is, laser diodes are a category of LEDs.

The plant-growing bench of the present invention is developed for the purpose of mass-production. The plant-growing bench is partitioned into a plurality of layers. On the ceiling of each layer are mounted electric tracks, while on each electric track are mounted LEDsets for simultaneously culturing a large quantity of plant lets. Furthermore, the user can individually control the LEDs' light quantity, light quality and lighting cycle via the driver. Therefore, the plant-growing bench of the present invention is adapted for culturing various kinds of plantlets, wherein the optimum growth conditions for each are different. Furthermore, researchers can use the plant-growing bench of the present invention to find the best light quantity and light quality for the growths of various plantlets, and to assess the acceptable lighting cycles for saving the electric power and enhancing the photosynthetic efficiency. Furthermore, the LEDsets of the present invention are designed so that their mounting and dismounting on the electric tracks is fast and easy, representing a great advantage to the construction of a new plant factory and maintenance of an existing plant factory.

While the invention has been described by way of example and in terms of the preferred embodiment, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An artificial lighting apparatus for young plants including:
    at least one electric track having a common ground line and a plurality of power lines, wherein a voltage of each power lines is different; and
    a plurality of lamps detachably mounted on the at least one electric track, and each of the lamps including a plurality of types of light emitting diodes powered by the plurality of voltage differences.

2. An artificial lighting apparatus for young plants as claimed in claim 1, wherein the plurality of types of light emitting diodes includes first light emitting diodes and second light emitting diodes.

3. An artificial lighting apparatus for young plants as claimed in claim 2, wherein the first light emitting diodes are red light emitting diodes and the second light emitting diodes are blue light emitting diodes.

4. An artificial lighting apparatus for young plants as claimed in claim 2, wherein the first light emitting diodes are red light emitting diodes and the second light emitting diodes are infrared light emitting diodes.

5. An artificial lighting apparatus for young plants as claimed in claim 2, wherein the first light emitting diodes are red light emitting diodes and the second light emitting diodes are white light emitting diodes.

6. An artificial lighting apparatus for young plants as claimed in claim 2, wherein the first light emitting diodes are blue light emitting diodes and the second light emitting diodes are infrared light emitting diodes.

7. An artificial lighting apparatus for young plants as claimed in claim 2, wherein the first light emitting diodes are blue light emitting diodes and the second light emitting diodes are white light emitting diodes.

8. An artificial lighting apparatus for young plants as claimed in claim 2, wherein the first light emitting diodes are infrared light emitting diodes and the second light emitting diodes are white light emitting diodes.

9. An artificial lighting apparatus for young plants as claimed in claim 2, wherein the plurality of power lines includes a first power line and a second power line, and the artificial lighting apparatus further including a driver connected to the common ground line, the first power line and the second power line of the at least one electric track for individually controlling the light quantity, light quality and lighting cycle of the first light emitting diodes and the second light emitting diodes.

10. An artificial lighting apparatus for young plants as claimed in claim 9, wherein the driver outputs a first waveform corresponding to the voltage of the first power line and a second waveform corresponding to the voltage of the second power line to the plurality of lamps, wherein the first waveform and the second waveform both include a carrier wave, and the carrier waves are adjustable.

11. An artificial lighting apparatus for young plants as claimed in claim 1, wherein the plurality of types of light emitting diodes includes first light emitting diodes, second light emitting diodes and third light emitting diodes.

12. An artificial lighting apparatus for young plant as claimed in claim 11, wherein the first light emitting diodes are red light emitting diodes, the second light emitting diodes are blue light emitting diodes, and the third light emitting diodes are infrared light emitting diodes.

13. An artificial lighting apparatus for young plants as claimed in claim 11, wherein the first light emitting diodes are red light emitting diodes, the second light emitting diodes are blue light emitting diodes, and the third light emitting diodes are white light emitting diodes.

14. An artificial lighting apparatus for young plants as claimed in claim 11, wherein the first light emitting diodes are red light emitting diodes, the second light emitting diodes are infrared light emitting diodes, and the third light emitting diodes are white light emitting diodes.

15. An artificial lighting apparatus for young plants as claimed in claim 11, wherein the first light emitting diodes are blue light emitting diodes, the second light emitting diodes are infrared light emitting diodes, and the third light emitting diodes are white light emitting diodes.

16. An artificial lighting apparatus for young plants as claimed in claim 11, wherein the plurality of power lines includes a first power line, a second power line and a third power line, and the artificial lighting apparatus further including a driver connected to the common ground line, the first power line, the second power line and the third power line of the at least one electric track for individually controlling the light quantity, light quality and lighting cycle of the first light emitting diodes, the second light emitting diodes and the third light emitting diodes.

17. An artificial lighting apparatus for young plants as claimed in claim 16, wherein the driver outputs a first waveform corresponding to a first voltage difference, a second waveform corresponding to a second voltage difference and a third waveform corresponding to a third voltage difference to the plurality of lamps, wherein the first waveform, the second waveform and the third waveform include a carrier wave, and the carrier waves are adjustable.

18. An artificial lighting apparatus for young plants as claimed in claim 1, wherein the plurality of types of light emitting diodes includes first light emitting diodes, second light emitting diodes, third light emitting diodes and fourth light emitting diodes.

19. An artificial lighting apparatus for young plants as claimed in claim 18, wherein the first light emitting diodes are red light emitting diodes, the second light emitting diodes are blue light emitting diodes, the third light emitting diodes are infrared light emitting diodes, and the fourth light emitting diodes are white light emitting diodes.

20. An artificial lighting apparatus for young plants as claimed in claim 18, wherein the plurality of power lines includes a first power line, a second power line, a third power line and a fourth power line, and the artificial lighting apparatus further including a driver connected to the common ground line, the first power line, the second power line, the third power line and the fourth power line of the at least one electric track for individually controlling the light quantity, light quality and lighting cycle of the first light emitting diodes, the second light emitting diodes, the third light emitting diodes and the fourth light emitting diodes.

21. An artificial lighting apparatus for young plants as claimed in claim 20, wherein the driver outputs a first waveform corresponding to a first voltage difference, a second waveform corresponding to a second voltage difference, a third waveform corresponding to a third voltage difference and a fourth waveform corresponding to a fourth voltage difference to the plurality of lamps, wherein the first waveform, the second waveform, the third waveform and the fourth waveform include a carrier wave, and the carrier waves are adjustable.

* * * * *